United States Patent Office 3,741,956
Patented June 26, 1973

3,741,956
CARDIO-ACTIVE GLYCOSIDES OF 3β,14-DIHYDROXY - 4,5β - OXIDO - 14β - BUFA - 20,22-DIENOLIDES AND PROCESS FOR THEIR PREPARATION
Kurt Radscheit, Kelkheim, Taunus, Ulrich Stache, Hofheim, Taunus, Werner Fritsch, Neuenhain, Taunus, Werner Haede, Hofheim, Taunus, and Ernst Lindner, Frankfurt am Main, Germany, assignors to Farbwerke Hoechst Aktiengesellschaft vormals Meister Lucius & Bruning, Frankfurt am Main, Germany
Filed Apr. 29, 1971, Ser. No. 138,458
Claims priority, application Germany, May 2, 1970, P 20 21 556.9
Int. Cl. C07c 173/00
U.S. Cl. 260—210.5
2 Claims

ABSTRACT OF THE DISCLOSURE 3-hydroxy-4,5β-oxido-bufadienolides of the general formula

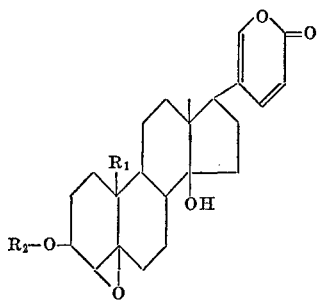

in which $R_1$ is $CH_3$—, CHO—, $CH_2OH$, $CH_2O$-alkyl, $CH_2O$ acyl and $R_2$ is mono-, di- or trisaccharidyl, optionally esterified, etherified or condensed with carbonyl compounds, e.g. 3β,14 - dihydroxy-4,5β-oxido-14β-bufa-20,22-dienolide, 3β-(α-L-rhamnoside) and 3β,14-dihydroxy - 4,5β-oxido-14β-bufa-20,22-dienolide, 3β-(β-D-glucoside).

Method for making these compounds (1) by acylating the corresponding glycosides, reacting the acylates with HOHal-forming agents to the corresponding 4,5-halohydrins which are then converted into 4,5β-epoxides by splitting off hydrogen halide, or (2) by reacting the corresponding aglycones of the above formula ($R_2$=H) with acylated 1-halopyranoses in inert solvents in the presence of silver salts, and finally hydrolyzing the acylated compounds to yield the free glycosides. These compounds have strong positive inotropic action and a pronounced cardioactive efficacy.

The present invention relates to cardioactive glycosides of 3β,14-dihydroxy-4,5β-oxido-14β-bufa-20,22 - dienolides and a process for their preparation.

It is known that glycosides of 4,5-oxido-bufadienolides are obtained by reacting glycosides of 3-hydroxy-bufa-4,20,22-trienolides with per-acids (German Offenlegungsschrift 1.913.491). As Henbest and Wilson (J. Chem. Soc. 1957, 1958) have shown, the epoxidation of Δ⁴-steroids with peroxycarboxylic acids is stereospecific in accordance with the nature of the substituent linked to the 3rd carbon atom: 3β-hydroxy compounds yield 4,5β-epoxides, the corresponding ether or acetyl compounds as well as the corresponding 3-glycosides yield the 4,5α-epoxides (Helv. Chim. Acta 51 (1968), 1353 et seq.).

Therefore, it is not possible to prepare the corresponding glycosides of 4,5β-oxido-bufa-dienolides by treating glycosides of 3-hydroxy-bufa-4,20,22-trienolides with peracids. Among the cardio-active glycosides however, those of the 5β-configuration have a better cardiotonic effect than those of the 5α-configuration.

The subject of the present invention are glycosides of 3-hydroxy-4,5β-oxido bufadienolides of the general Formula I

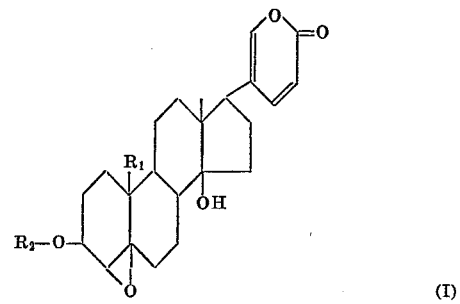

in which $R_1$ represents a $CH_3$—, CHO—, $CH_2OH$—, $CH_2O$-alkyl, $CH_2O$-acyl group and $R_2$ stands for a mono-, di- or trisaccharide radical which may optionally be esterified, etherified or condensed with carbonyl compounds. As sugar radicals, the following substances may be used: glucose, rhamnose, galactose, arabinose, digitoxose, fucose, mannose, lyxose or xylose, thevetose or glucorhamnose.

The subject of the present invention is furthermore a process for the preparation of compounds of Formula I, which comprises either (a) acylating the corresponding glycosides of the general Formula II

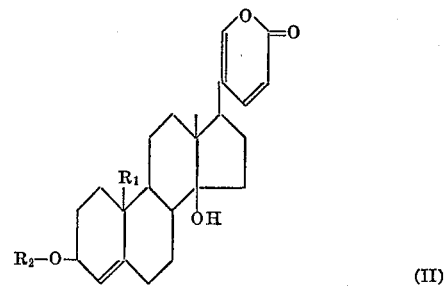

in which $R_1$ and $R_2$ are as defined above, then reacting the acylates with HOHal forming agents in order to obtain the corresponding 4,5-halohydrins, and finally converting these 4,5-halohydrins into the 4,5β-epoxides by means of agents splitting off hydrogen halide, or (b) reacting the corresponding aglycones of Formula I, in which $R_2$ represents hydrogen, with acylated 1-halopyranoses in an inert solvent in the presence of silver salts, and thereafter optionally hydrolyzing the acylated compounds obtained according to (a) or (b) to the free glycosides, or, after the hydrolysis, acylating them again or etherifying them, or condensing them with carbonyl compounds, according to methods usual in sugar chemistry.

The process of the invention according to (a), in case proscillaridin is used as starting material, has the following reaction scheme:

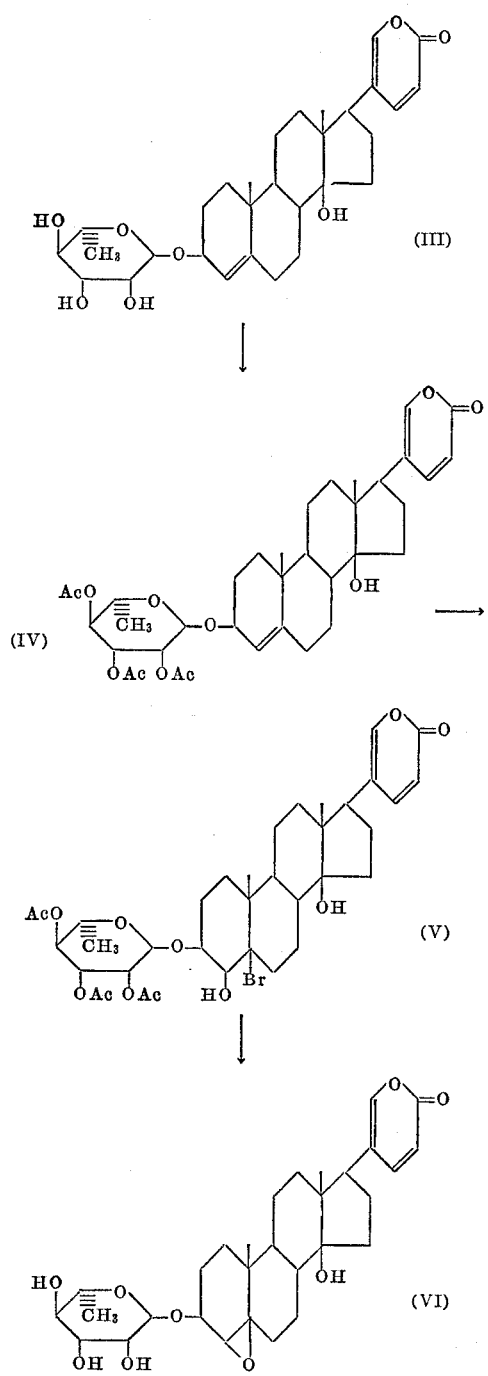

The acylation of the proscillaridin into the acylate (IV) according to (a) is carried out in known manner, for example by reaction with halides or anhydrides of monocarboxylic acids. As acyl radicals of monocarboxylic acids, the formyl, acetyl, propionyl, butyryl, benzoyl or p-nitrobenzoyl radicals may be used. The 14-OH-group is unaffected by the acylation reaction. The halohydrins (V) are prepared from the olefins (IV) by methods known for analogous cases using N-halo-amides or hypohalous acids, for example using N-bromo-acetamide, in the presence of perchloric acid, or advantageously also using N-bromo-sulfonamides of aromatic sulfonic acids, for example using N,N-dibromo-benzene-sulfonamide in a weakly acidic medium such as an acetic acid medium, or in inert solvents such as dioxane. The reaction is carried out at temperatures of from −30° to +30° C. within a period of from 30 minutes to several hours. The halohydrins of Formula V can be converted into the 4,5β-oxido compounds of Formula VI without further purification either at once in the reaction mixture or after their isolation.

In this process step, the halohydrins are reacted with weak alkalis, for example with a mixture of sodium acetate and glacial acetic acid in methanol at pH 7; or they are treated with basic, neutral or acidic aluminum oxide, as it is used for example in chromatography, in a solvent inert to aluminum oxide; or with tertiary organic bases, for example pyridine, collidine, triethylamine or 1,5-diazabicyclo[4,3,0]-5-nonene.

The hydrolysis of the acylated 4,5β-epoxide of VI is carried out by a method usual in sugar chemistry or when hydrolyzing acylated cardiac glycosides, for example using methanolic ammonia or potassium bicarbonate in aqueous methanol, or an alkaline alcoholate or an alkaline earth alcoholate.

The process of the invention according to (b) is carried out as follows:

Acylated 1-halopyranose and silver carbonate each are added in portions at regular intervals to the dissolved genin at boiling temperature of the solvent, or the genin and the acylated 1-halopyranose are first introduced into the vessel together with part of the totally needed silver carbonate, and the rest of the silver carbonate is added in portions within a longer period. Depending on the reactivity of the components used, the reaction time is from 5 minutes to 8 hours. In total, a 2 to 30-fold excess of acylated halogen sugar and silver carbonate are used.

As solvents, suitable substances are those with which water can be removed from the reaction mixture by means of azeotropic distillation, preferably at boiling temperature of the solvent; for example methylene chloride; 1,2-dichloroethane, benzene or toluene are used. The solvent is replaced in the same rate as it is removed in the distillation; or the reaction is carried out using a reflux condenser, and the refluxed solvent is led through an extraction shell containing a drying agent; or the reaction mixture is slowly concentrated without feeding in new solvent amounts.

The hydrolysis of the acyl groups is carried out in known manner either with sodium or potassium carbonate in an aqueous-alcoholic medium, or with $NH_3$ in methanol or ethanol.

The steroid compounds used as starting substances are obtained from corresponding $\Delta^4$-compounds by reaction with a per-acid, for example perbenzoic or monochloroperbenzoic acid, in the presence of an inert solvent, for example methylene chloride. The reaction mixture is allowed to stand for several hours at room temperature.

It is a surprising fact that the process of the invention according to (a) as well as according to (b) can be carried out successfully. As to method (a), it could not be expected that the reaction of the products of Formula II with HOHal forming agents in an acidic medium would succeed without elimination of the glycoside group in the allylic position. As is known (L. F. Fieser/M. Fieser, "Steroide," Verlag Chemie, Weinheim/Bergstr., 1961, p. 862), even gentle treatment of proscillaridin with acid provokes the elimination of the glycoside group in the allylic position.

Neither was the success of the process according to (b) expected, since it could not be predicted whether the epoxy-aglycones of Formula I ($R_2$=H) would be converted into the desired products without impairing the epoxy function under the acidic reaction conditions of the glycosidation. It is known that epoxides are subject to alterations, such as ring opening or transposition, under acidic reaction conditions.

The compounds of Formula I obtained in the process of the invention are new compounds. Tests were made on an isolated atrium of a guinea pig's heart as well as a potassium excretion test on an isolated guinea pig's heart. These tests demonstrated that the compounds of the invention are distinguished by a high positive inotropic activity and therefore by a very distinctive cardioactive efficacy. As glycosides, they show more favorable properties as to solubility, distribution and absorption in the organism than the corresponding aglycones. They are appropriate for medicinal treatment of heart injuries, especially of cardiac insufficiency and tachycardia. The individual dosage to be administered to human beings is in the range from 0.1 to 0.3 mg. per dosage unit form. The products are preferably administered in their oral application form as tablets or dragées. For this purpose, the usual pharmaceutical adjuvants and carriers are used, such as starch, lactose, tragacanth, magnesium stearate and talc.

The following examples illustrate the invention:

EXAMPLE 1

3$\beta$,14-dihydroxy-4,5$\beta$-oxido-14$\beta$-bufa-20,22-dienolide, 3$\beta$-($\alpha$-L-rhamnoside)

(a) Proscillaridin-A-triacetate (IV).—5 g. of proscillaridin are dissolved in 62 cc. of pyridine, combined with 33 cc. of acetic anhydride, heated for 2½ hours to 100° C. and allowed to stand for 16 hours at room temperature. The precipitate obtained by stirring the reaction mixture into 2 liters of icewater is washed with water, dried over $P_2O_5$, absorbed in a bit of methylene chloride for further purification, and then filtered over silica gel. The combined extract residues obtained with methylene chloride and ethyl acetate are crystallized with petroleum ether, 6 g. of proscillaridin-A-triacetate having a melting point of 135–145° C. are obtained. $[\alpha]_D^{20}$: —64.9° (chloroform).

(b) Bromohydrine (V).—2 g. of proscillaridin-A-triacetate are dissolved in 50 cc. of dioxane and combined with 10 cc. of water, 1 cc. of glacial acetic acid and 1 g. of N,N-dibromo-benzene-sulfonamide. The reaction mixture is allowed to stand in the dark for 2 hours at 0° C. Subsequently, it is poured into an ice-cold solution of sodium thiosulfate. The obtained precipitate of bromohydrin (V) is filtered off and dissolved in methylene chloride for further work-up, and the solution is dried over sodium sulfate.

(c) Epoxide (VI).—The dried solution of bromohydrin in methylene chloride obtained according to (b) is combined with 20 g. of neutral aluminum oxide "Woelm" of activity degree II, and the mixture is stirred in the dark for 1 hour. Subsequently, the solution is filtered off the aluminum oxide, the filtrate is evaporated in vacuo, the residue is dissolved in 100 cc. of methanol and combined with 30 cc. of a methanolic solution of $NH_3$ saturated at 0° C. The reaction mixture is maintained at 0° C. for 20 hours and subsequently evaporated to dryness in vacuo. The residue is dissolved in a mixture of tetrahydrofurane/ethyl acetate/methanol and filtered over silica gel. It is extracted first with methylene chloride and then with ethyl acetate. The ethyl acetate extract is evaporated, and the residue is purified of less polar byproducts by preparative layer chromatography using ethyl acetate as eluent. After trituration with acetone/ether, the 3$\beta$,14-dihydroxy-4,5$\beta$-oxido-14$\beta$-bufa-20,22-dienolide, 3$\beta$-($\alpha$-L-rhamnoside), having a melting point of 170–175° C. (indefinite), is obtained.

Infrared spectrum: see FIG. 1 (KBr spectrum).

EXAMPLE 2

3$\beta$,14-dihydroxy-4,5$\beta$-oxido-14$\beta$-bufa-20,22-dienolide, 3$\beta$-($\beta$-D-glucoside)

900 mg. of 3$\beta$,14-dihydroxy-4,5$\beta$-oxido-14$\beta$-bufa-20,22-dienolide, 3 g. of acetobromoglucose, 1.8 g. of silver carbonate and 1.8 g. of CaO are combined with 3.6 cc. of toluene and 18 cc. of dichloroethane, and the reaction mixture is heated to boiling by means of a heating bath preheated to 135° C. Subsequently, a mixture of 1.2 g. of acetobromoglucose, 0.85 g. of silver carbonate and 0.85 g. of CaO is added to the boiling reaction mixture. This operation is repeated two times again in an interval of 1 minute each. After adding acetobromoglucose silver carbonate and CaO for the last time, the whole is allowed to boil for a further minute, then combined with 10 cc. of dichloro-ethane, and, after a further reaction time of 2 minutes, the solvent is nearly completely eliminated by distillation. The remaining reaction residue is stirred with chloroform, the insoluble parts are filtered off, and the chloroform solution is evaporated in vacuo.

The remaining residue is dissolved in 150 cc. of methanol, combined with 75 cc. of a methanolic solution of $NH_3$ saturated at 0° C., and maintained at 0° C. for 20 hours. The reaction solution is then evaporated to dryness in vacuo. The residue is dissolved in a mixture of methanol and water and the solution is carefully extracted with chloroform. The extract is dried over sodium sulfate and evaporated to dryness in vacuo, then absorbed again in a mixture of methylene chloride/tetrahydrofurane and subjected to chromatography on silica gel. Elution is then carried out, first with methylene chloride and then with mixtures of methylene chloride and methanol using increased proportions of methanol. The extracts obtained with the solvent mixtures of methylene chloride/methanol (from 5 to 20%) are evaporated, the residue is triturated with a bit of acetone/ether, and the crystals are filtered. The 3$\beta$,14-dihydroxy-4,5$\beta$-oxido-14$\beta$-bufa-20,22-dienolide, 3$\beta$-($\beta$-D-glucoside), having a melting point of 160°–170° C. (indefinite), is obtained. $[\alpha]_D^{20}$: —20° (methanol). Infrared spectrum: see FIG. 2 (KBr spectrum).

EXAMPLE 3

3$\beta$,14-dihydroxy-4,5$\beta$-oxido-14$\beta$-bufa-20,22-dienolide, 3$\beta$($\alpha$-L-rhamnoside)

The rhamnoside is prepared according to the method described in Example 2. As the acyl-halopyranose, acetobromorhamnose is used. The work-up, the purification of the crude product by chromatography, as well as the crystallization of the final product are carried out as described in Example 2. Thus, 3$\beta$,14-dihydroxy-4,5$\beta$-oxido-14$\beta$-bufa-20,22-dienolide, 3$\beta$-($\alpha$-L-rhamnoside), having a melting point of 170°–175° C. (indefinite), is obtained. Infrared spectrum: see FIG. 3 (KBr spectrum).

Preparation of the starting substances for Examples 2 and 3

4,5$\beta$ - oxido - 3$\beta$,14$\beta$ - dihydroxy-bufa-20(21),22(23)-dienolide (=4,5$\beta$-oxido-scillarenin A).—58 mg. of m-chloro-perbenzoic acid are added to 80 mg. of scillarenin in 6.7 ml. of absolute methylene chloride, and the whole is allowed to stand for 2 hours at room temperature. Subsequently, the reaction mixture is poured into an excess of an aqueous sodium bicarbonate solution and is then extracted several times with methylene chloride. The combined extracts are washed first with sodium bicarbonate solution and then with water. After distilling off the solvents, a solid residue remains which is dissolved in great quantities of hot methanol. The solution is decanted off the residue and evaporated, again absorbed in a mixture of tetrahydrofurane and methanol, and subjected to chromatography on basic aluminum oxide of activity degree II. Elution is carried out using, one after the other, benzene, mixtures of methylene chloride and ethyl acetate, and finally ethyl acetate containing 5% of methanol. From the last extract, 40 mg. of the white crystalline epoxide are obtained which, after recrystallization in absolute ethanol, have a melting point of 236°–238° C. (Tottoli).

Typical infrared bands: 3460, 3060, 1740 (shoulder), 1710, (measured in KBr) 1625–1630, 1530–1540, 1240 cm.$^{-1}$. Ultraviolet spectrum: $\lambda$ max.=297–298 m$\mu$, $\epsilon$=6,650.

We claim:
1. 3$\beta$,14 - dihydroxy - 4,5$\beta$ - oxido-14$\beta$-bufa-20,22-dienolide, 3$\beta$-($\alpha$-L-rhamnoside).
2. 3$\beta$,14 - dihydroxy - 4,5$\beta$ - oxido-14$\beta$-bufa-20,22-dienolide, 3$\beta$-($\beta$-D-glucoside).

References Cited
UNITED STATES PATENTS

| | | | |
|---|---|---|---|
| 3,341,523 | 9/1967 | Komeno | 260—239.55 R |
| 3,346,603 | 10/1967 | Lefebvre et al. | 260—239.55 R |
| 3,629,234 | 12/1971 | Eberlein et al. | 260—210.5 |

LEWIS GOTTS, Primary Examiner
J. R. BROWN, Assistant Examiner

U.S. Cl. X.R.
424—182